United States Patent
Kalaboukis et al.

(10) Patent No.: US 10,825,022 B1
(45) Date of Patent: Nov. 3, 2020

(54) SYSTEMS AND METHODS FOR PURCHASES LOCKED BY VIDEO

(71) Applicant: Wells Fargo Bank, N.A., San Francisco, CA (US)

(72) Inventors: Chris Kalaboukis, San Jose, CA (US); Machu J. Latorre, Alameda, CA (US); Evelyn Ujanen, San Francisco, CA (US); Marria Wairmola Rhodriquez, San Francisco, CA (US); Tleytmas N. Stephenson, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 575 days.

(21) Appl. No.: 15/449,409

(22) Filed: Mar. 3, 2017

(51) Int. Cl.
  *G06Q 20/40* (2012.01)
  *G06Q 50/00* (2012.01)
  *G06Q 30/02* (2012.01)

(52) U.S. Cl.
  CPC ............ *G06Q 20/40* (2013.01); *G06Q 30/02* (2013.01); *G06Q 50/01* (2013.01)

(58) Field of Classification Search
  CPC ....................................... G06Q 30/02
  See application file for complete search history.

(56) References Cited

U.S. PATENT DOCUMENTS

| | | | | |
|---|---|---|---|---|
| 8,127,982 B1* | 3/2012 | Casey | ............ | G06Q 20/35785 235/379 |
| 9,167,014 B2 | 10/2015 | Baldwin et al. | | |
| 2010/0030578 A1* | 2/2010 | Siddique | ................ | G06Q 30/06 705/3 |
| 2010/0138304 A1 | 6/2010 | Boyarsky et al. | | |
| 2011/0184780 A1 | 7/2011 | Alderson et al. | | |
| 2013/0132221 A1 | 5/2013 | Bradford et al. | | |
| 2014/0081804 A1* | 3/2014 | Nuzzi | ................ | G06Q 30/0601 705/26.41 |
| 2014/0100924 A1 | 4/2014 | Ingenito et al. | | |
| 2014/0149213 A1 | 5/2014 | Fallatah | | |

(Continued)

OTHER PUBLICATIONS

Kushin et al, "Did Social Media Really Matter? Use of Online Media and Political Decision Making in the 2008 Election," Mass Communication and Society, 12:608-630, 2010. 24 pages.

*Primary Examiner* — Scott S Trotter
(74) *Attorney, Agent, or Firm* — Foley & Lardner LLP

(57) ABSTRACT

Systems and methods for completing a permissioned payment are described herein. The system includes a network interface structured to facilitate data communication via a network, an accounts database structured to store information associated with one or more accounts held by a financial institution, including a payment account associated with a customer and a customer identifier, and a processing circuit. The processing circuit is configured to receive a purchase approval request including a purchase amount and the customer identifier and generate a notification in response to determining that the purchase amount exceeds a threshold payment amount, the notification indicating that the purchase approval request requires voting approval via a voting approval process, transmit the notification to a customer device, conduct the voting approval process including receiving votes from a plurality of social connections of the customer, and authorize or decline the purchase approval request based on the voting approval process.

22 Claims, 8 Drawing Sheets

(56) References Cited

U.S. PATENT DOCUMENTS

| | | |
|---|---|---|
| 2014/0150029 A1 | 5/2014 | Avedissian et al. |
| 2014/0351026 A1 | 11/2014 | Merel |
| 2015/0106236 A1* | 4/2015 | Morris .................. G06Q 50/01 705/26.64 |
| 2015/0271541 A1* | 9/2015 | Gonder ................ H04N 21/278 725/134 |
| 2016/0071349 A1* | 3/2016 | Tambaku ............... G07C 13/00 705/12 |

* cited by examiner

SYSTEMS AND METHODS FOR PURCHASES LOCKED BY VIDEO

TECHNICAL FIELD

Embodiments of the present disclosure relate generally to the field of financial transactions.

BACKGROUND

Customers making purchases using an account held at a financial institution may make financially unhealthy decisions by splurging on a purchase. Conventionally, financial institutions may check available funds in an account for a purchase, perform credit checks, transfer settlements, etc., but traditionally do not have a role in the customer's decision to make a purchase for budgeting reasons. Without any intermediary approval step, customers may end up making purchases they later regret. As such, customers may desire to set spending limits that require approval. Additionally, customers may desire to get input from social connections before making a purchase.

SUMMARY

A first example embodiment relates to a system. The system includes a network interface structured to facilitate data communication via a network, an accounts database structured to store information associated with accounts held by the financial institution, including a payment account associated with a customer associated with a customer identifier, and a processing circuit comprising a processor and memory. The processing circuit is configured to receive a purchase approval request including a purchase amount and the customer identifier, generate a notification in response to determining that the purchase amount exceeds a threshold payment amount, the notification indicating that the purchase approval request requires voting approval via a voting approval process, transmit the notification to a customer device associated with the customer, conduct the voting approval process, where the voting approval process includes receiving votes from a number of social connections of the customer, and authorize or decline the purchase approval request based on the voting approval process.

Another example embodiment relates to a method of completing a permissioned payment. The method includes receiving, by a financial institution computing system, a purchase approval request including a purchase amount and a customer identifier, generating a notification in response to determining that the purchase amount exceeds a threshold payment amount, the notification indicating that the purchase approval request requires voting approval via a voting approval process. The method further includes transmitting the notification to a customer device associated with the customer, conducting the voting approval process including receiving votes from a number of social connections of the customer, and authorizing or declining, by the financial institution computing system, the purchase approval request based on the voting approval process.

A further example embodiment relates to an apparatus. The apparatus includes a network interface structured to communicate data to and from a financial institution computing system associated with a financial institution, a display device configured to present information to a customer, an input/output device structured to exchange data with the customer, and a processing circuit comprising a processor and memory. The memory is structured to store instructions that are executable by the processor and cause the processing circuit to receive, by the input/output device, a permissioned payment parameter, transmit, by the network interface, the permissioned payment parameter to the financial institution computing system, and generate a purchase approval request associated with the payment account and including a purchase amount. The processing circuit is further configured to transmit, by the network interface, the purchase approval request to a financial institution computing system, receive, by the network interface, voting approval data from a voting approval process completed by the financial institution computing system, and generate, by the display device, a voting approval presentation including the voting approval data.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring to the Figures generally, various systems, methods, and apparatuses for facilitating payment transactions with a merchant are described herein. More particularly, systems and methods for facilitating permissioned payment transactions for purchases above a predetermined threshold are described herein. Prior to completing a purchase that exceeds a predetermined threshold amount, input regarding approval of the purchase from social network connections is requested. The social network connections can approve or deny the transaction based on details the user shares regarding the purchase item. In this way, the user is discouraged from making relatively large spontaneous purchases without first thinking through the purchase and receiving input from other individuals regarding the purchase decision.

In some arrangements, the user 104 may agree to participate in a permissioned payment program facilitated by a financial institution 102. When referred to herein, a "permissioned payment" is a payment transaction that must first be approved by a group of social network connections (e.g., Facebook® friends, Twitter® followers). Without approval from the social network connections, the system described herein declines the purchase of items above a predetermined threshold purchase amount.

An example implementation may be described as follows. A user enters a merchant location and selects a television to purchase. The user opens a banking application on his mobile device and submits the television for approval to a group of his social network connections. The user may live stream a "pitch" for the television, stating any reasons the user desires the television or why the user believes the television is a wise financial decision (e.g., the user's television is broken, too small). As the user is conducting his video pitch, his social connections vote approval or denial of the television purchase. Once a predetermined number of votes are counted and/or a predetermined time has passed, and a threshold number or percentage of the connections approve the television for purchase, the user receives a notification that the television is approved. At this point, the user completes the purchase by swiping his card at a merchant point-of-sale (POS) terminal.

In another example implementation, the user may attempt to purchase the television prior to engaging with a social network application and/or prior to requesting and receiving approval from social network connections. Upon swiping his card, the user is alerted that the transaction is declined due to a permissioned payment rejection. The user can then use his mobile device to pitch the television to a group of his connections on a social network. If a predetermined percentage or number of the connections approves the television for purchase, the transaction is unlocked and the user can purchase the television.

Figure 1:
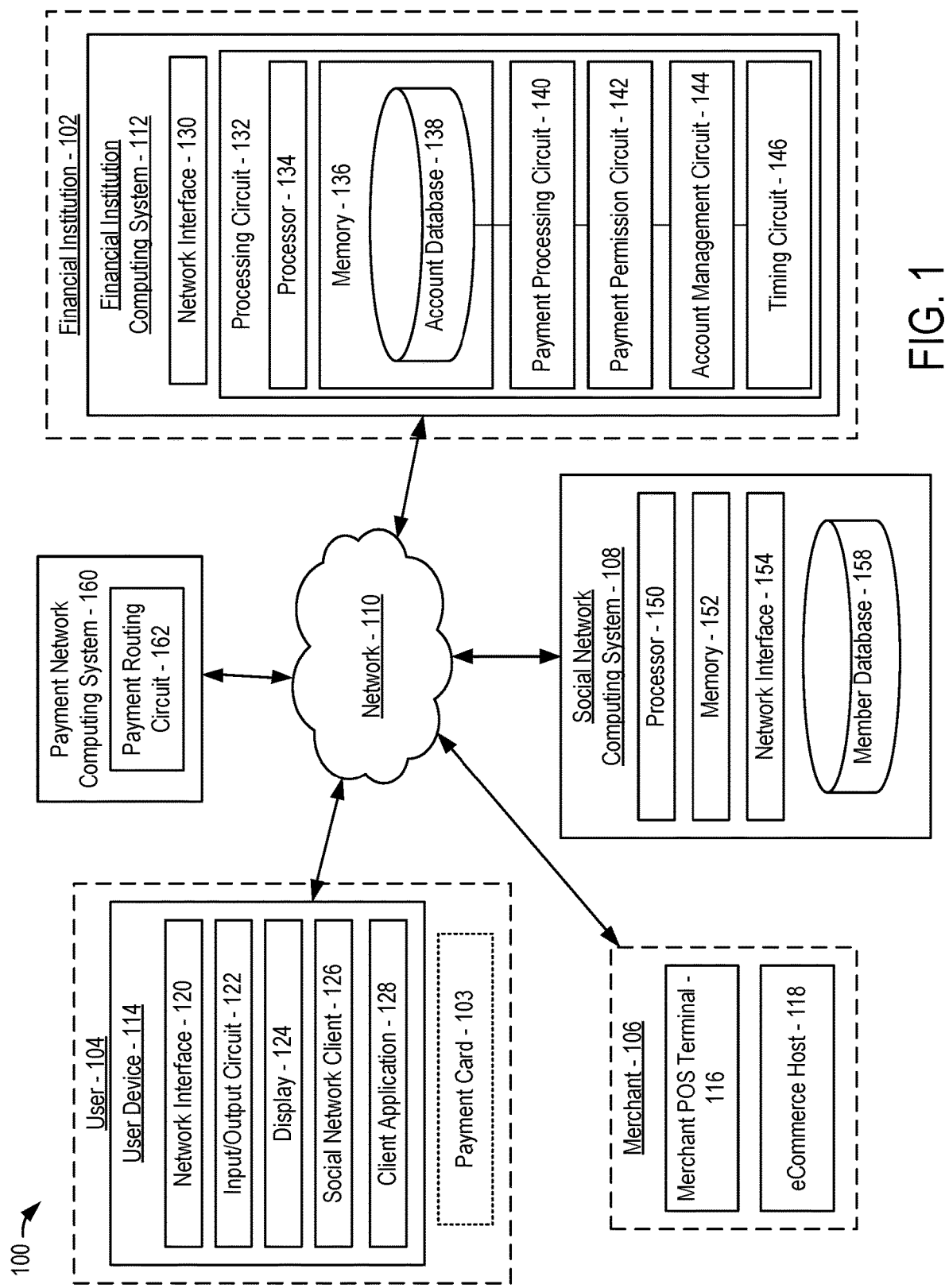
FIG. 1 is a schematic diagram of a permissioned payment system, according to an example embodiment.

Referring to FIG. 1, a view of a payment permission system 100 is shown according to an example embodiment. Generally, the system 100 facilitates a purchase by a user 104 from a merchant 106 with payment from an account (e.g., checking account) associated with the user 104 and maintained by a financial institution 102. The user 104 and payment account held by the user 104 may be associated with a customer identifier. Through the system, the user 104 can pay for purchases with the account through any number of channels, including a mobile wallet client 128 running on the user device 114 associated with the user 104, a payment card 103 (e.g., debit card, credit card) associated with the account, or by providing payment account information to the merchant 106 (e.g., via the user device 114, via the payment card 103, by providing payment account information to a representative in person or over the phone, by entering payment account information into a website).

The system 100 includes a financial institution computing system 112 associated with the financial institution 102, where the financial institution computing system 112 is communicably and operatively coupled to a user device 114, social network computing system 108, and a payment network computing system 160 over a network 110. The network 110 provides communicable and operative coupling between the user device 114, the payment network computing system 160, the financial institution computing system 112, and other components disclosed and described herein to provide and facilitate the exchange of communications (e.g., data, instructions, messages, values, commands). Accordingly, the network 110 may include any network including wired (e.g., Ethernet) and/or wireless networks (e.g., 802.11X, ZigBee, Bluetooth, WiFi). In some arrangements, the network 110 includes the Internet. In further embodiments, the network 110 includes a proprietary banking network to provide secure or substantially secure communications.

The user device 114 includes any type of computing device that may be used to facilitate financial transactions at a financial institution 102. In some arrangements, the user 104 uses the user device 114 to perform payment transactions. The user device 114 may include any wearable and non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), etc. The user device 114 may also include any type of mobile device including, but not limited to, a phone (e.g., smartphone), and/or any type of computing devices (e.g., desktop computer, laptop computer, personal digital assistant).

The user device 114 further includes a network interface 120, a display 124, an input/output circuit 122, a social network client 126, and a mobile wallet client 128. The network interface 120 of the user device 114 is adapted for and configured to establish a communication session via the network 110 with the financial institution computing system 112, social network computing system 108, and merchant 106. Accordingly, the network interface 120 includes any of a cellular transceiver (Code Division Multiple Access (CDMA), Global System for Mobile Communications (GSM), Long-Term Evolution (LTE)), a wireless network transceiver (e.g., 802.11X, ZigBee, Bluetooth), or a combination thereof (e.g., both a cellular transceiver and a Bluetooth transceiver).

The display 124 is used to present payment account information, transaction information, and the like. The display 124 is further used to present payment permission prompts and payment approvals and/or denials to the user 104. In this regard, the display 124 is communicably and operatively coupled to the input/output circuit 122 to provide a user interface for receiving and displaying information on the user device 114.

The input/output circuit 122 is structured to receive and provide communication(s) to a user of the user device 114. In this regard, the input/output circuit 122 is structured to exchange data, communications, instructions, etc., with an input/output component of the user device 114. Accordingly, in one embodiment, the input/output circuit 122 includes an input/output device such as a display device, a touchscreen, a keyboard, and a microphone. In another embodiment, the input/output circuit 122 may include communication circuitry for facilitating the exchange of data, values, messages, and the like between an input/output device and the components of the user device 114. In yet another embodiment, the input/output circuit 122 may include machine-readable media for facilitating the exchange of information between the input/output device and the components of the user device 114. In still another embodiment, the input/output circuit 122 may include any combination of hardware components (e.g., a touchscreen), communication circuitry, and machine-readable media.

The social network client 126 is configured to permit management of the user's social network accounts and communications associated with a social network. Accordingly, the social network client 126 is communicably coupled to the social network computing system 108. In some embodiments, the social network client 126 is a separate software application implemented on the user device 114. The social network client 126 may be downloaded by the user device 114 prior to its usage, hard coded into the memory of the user device 114, or be a web-based interface application such that the user device 114 may provide a web browser to the application, which may be executed remotely from the user device 114. In the latter instance, the user 104 may have to log onto or access the web-based interface before usage of the applications. Further, and in this regard, the social network client 126 may be supported by a separate computing system including one or more servers, processors, network interface circuits, etc., that transmit applications for use to the computing device. In certain embodiments, the social network client 126 includes an API and/or a software development kit (SDK) that facilitate the integration of other applications (e.g., the mobile wallet client 128) with the social network client 126 such that the financial institution computing system 112 receives user social media activity over the network 110. Accordingly, social media activity of the user is transmitted to the financial institution computing system 112 such that the financial institution 102 uses the social media activity to approve or deny payment transactions from the user 104 to the merchant 106. In some embodiments, the user device 114 includes multiple social network clients 126 associated with multiple social media networks and respective social network computing systems 108.

The social network client 126 is structured to provide displays to the user device 114 that enable the user 104 to manage social network accounts as well as communicate information over a social network platform. In some arrangements, the displays include payment permission interfaces, where social network connections of the user 104 vote on a proposed payment transaction, as described further herein.

In some arrangements, the social network client 126 is further configured to receive approval groups defined by the user 104. The received approval groups are stored in the member database 158. When referred to herein, the term "approval groups" refers to a subset of social network connections the user 104 has designated for purchase approval roles in certain instances (e.g., friends, family, purchases at particular merchants, purchases of a certain purchase amount, particular products). The user can define the approval groups according to a type of product being purchased and/or the merchant the product is being purchased from. For example, the user 104 designates that Group A is the approval group for electronics purchases. As a further example, the user 104 designates that Group B is the approval group for purchases from merchant B. In such an arrangement, the social network client 126 communicates with the client application 128 to allow access to the approval group information. In some arrangements, the client application 128 is configured to receive the approval groups defined by the user 104.

The client application 128 is an application executed by the user device 114 associated with the user 104. The client application 148 is communicably coupled to the financial institution computing system 112 (e.g., the accounts database 138, payment processing circuit 140, etc.) via the network 110 and is structured to permit management of the user's accounts (e.g., payment accounts) via the client application 128. In this regard, the client application 128 may provide displays indicative of current account balances, pending transactions, profile information (e.g., contact information), pre-set threshold payment information, approval threshold information, and the like.

The client application 128 is configured to receive parameters for the permissioned payment system 100 from the user 104, including the threshold payment amount and the approval threshold. When referred to herein, the "threshold payment amount" is the highest purchase amount that can be completed without approval from the permissioned payment system and the "approval threshold" includes the number or percentage of approval votes needed to complete a purchase.

The user 104 can define the threshold payment amount using the client application 128 on the user device 114. In some embodiments, a third party (e.g., parent, guardian, financial institution) can define the threshold payment amount in addition to the user 104. The threshold payment amount is stored in the accounts database 138 for access by the payment permission circuit 142, described further herein. In some arrangements, the user 104 may designate threshold payment information according to type of account (e.g., checking account, credit card account). For example, the user 104 designates that all purchases made with a certain checking account have a threshold amount of $200. In further arrangements, the user 104 may designate threshold payment information according to type of item and/or type of merchant. For example, the user 104 designates that all electronics purchases have a threshold of $500. As a further example, the user 104 may define that all purchases from merchant A have a threshold of $300.

The user 104 can define the approval threshold using the client application 128 on the user device 114. In some embodiments, a third party (e.g., parent, guardian, financial institution) can define the approval threshold in addition to the user 104. The received approval threshold is stored in the accounts database 138 for access by the payment permission circuit 142, described further herein. The user 104 (or a third party) may designate approval thresholds by percentage of approval votes or number of approval votes. For example, the user 104 may designate that all purchases must be approved by at least 80% of the voting connections watching a live stream video. Further, the user 104 (or a third party) may designate certain approval thresholds for certain products and/or merchants. For example, the user 104 designates that an approval threshold of 80% is needed for the purchase of electronics over the threshold limit of $500.

The client application 128 may include a mobile wallet client structured to provide payment account information to the merchant POS terminal 116 (e.g., by presenting a payment code on a display of the user device, by transmitting payment account information via a Bluetooth or NFC transmission). The mobile wallet client may store and/or transmit the payment account information in accordance with the EMV® "Payment Tokenisation Specification—Technical Framework," EMVCo, LLC (Version 1.0, 2014), which is herein incorporated by reference in its entirety and for all purposes. In some arrangements, the mobile wallet client 128 may be any of Apple® Pay, Android® Pay, Samsung® Pay, Wells Fargo® Wallet, or the like.

The payment card 103 is a physical card, such as a credit card, a debit card, a prepaid card, or the like. Accordingly, the payment card 103 can provide account information associated with the payment account (e.g., account number, expiration date) to a merchant POS terminal 116 during a transaction between the merchant 106 and the user 104. The account information may be transmitted, for example, through an encoded magnetic stripe, an embedded smart chip (e.g., an EMV chip), through an embedded near-field communication ("NFC") tag, or the like. For example, the user 104 can swipe, insert, or tap the payment card 103 at the merchant POS terminal 116 during an in-person transaction at a location of the merchant 106.

The user 104 can also provide the payment account information to an eCommerce host 118 associated with the merchant 106 during an online transaction. For example, the user 104 can access the online shopping website associated with the merchant 106 via the user device 114 and provide payment account information through a checkout feature of the online shopping website. In some arrangements, the payment account information corresponds to an account number and expiration date printed or displayed on the payment card 103. The payment account information may, for example, be input into the user device 114 by the user 104 by typing the payment card information in or by transmitting the payment account information from the payment card 103 to the user device 114. In an alternate arrangement, the payment account information can be provided via transmission from the mobile wallet client 128 to the eCommerce host 118. In a further arrangement, the payment account information can be provided over the phone to a representative of the merchant 106 and associated with a transaction facilitated with the eCommerce host 118.

Still referring to FIG. 1, in some arrangements, the payment account is associated with a payment network (e.g., Visa®, MasterCard®, American Express®, Discover®). Accordingly, when the payment account information is received by the merchant 106 during a transaction with the user 104, the payment account information and the transaction information (e.g., price, merchant information), is transmitted to a payment network computing system 160 associated with the payment account. At the payment network computing system 160, a payment routing circuit 162 routes the transaction information and payment account information to the financial institution computing system 112 for further processing (e.g., as described further herein). In some arrangements, the payment routing circuit 162 is structured to detokenize a tokenized payment account number received from the merchant 106 (e.g., if the user 104 is paying for the transaction via the mobile wallet client 128). In other arrangements, the tokenized payment account number is detokenized by the payment processing circuit 140 of the financial institution computing system 112.

The system 100 further includes the social network computing system 108. The social network computing system 108 provides access to a social network to registered users (e.g., the users associated with the user devices 104). The social network computing system 108 includes a processor 150, memory 152, and a network interface 154. The memory 152 stores various program instructions that, when executed by the processor 150, control the operation of the social network computing system 108. The social network computing system 108 is structured to facilitate data communication to and from other devices via the network 110 through the network interface 154. Data passing through the network interface 154 may be encrypted such that the network interface 154 forms a secure communication module. The social network computing system 108 further includes a member database 158. The member database 158 stores information associated with members of the social network maintained by the social network computing system 108, such as member names, member usernames, member personal information, member connections and friends, member interests, member login credentials, member contact information, and the like. In some arrangements, the member database 158 also stores approval group information for the permissioned payment system 100.

Still referring to FIG. 1, the financial institution computing system 112 is associated with the financial institution 102. The financial institution 102 may be, for example, a credit card issuer, a bank, or the like. The financial institution computing system 112 includes a processing circuit 132 having a processor 134 and a memory 136. The processor 134 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 136 (e.g., RAM, NVRAM, ROM, Flash Memory, hard disk storage) may store data and/or computer code for facilitating the various processes described herein. Moreover, the one or more memory devices 136 may be or include tangible, non-transient volatile memory or non-volatile memory. Accordingly, the one or more memory devices 136 may include database components, object code components, script components, or any other type of information structure for supporting the various activities and information structures described herein.

The financial institution computing system 112 further includes a network interface 130, which is used to establish connections with other components of the system 100 by way of network 110. The network interface 130 includes program logic that facilitates connection of the financial institution computing system 112 to the network 110. The network interface 130 supports communication between the financial institution computing system 112 and other systems, such as the user device 114 and social network computing system 108. For example, the network interface 130 includes a cellular modem, a Bluetooth transceiver, a Bluetooth beacon, a radio-frequency identification (RFID) transceiver, and a near-field communication (NFC) transmitter. In some embodiments, the network interface 130 communicates via a secured wired connection within a branch of the financial institution 102. In some arrangements, the network interface 130 includes the hardware and machine-readable media sufficient to support communication over multiple channels of data communication. Further, in some arrangements, the network interface 130 includes cryptography capabilities to establish a secure or relatively secure communication session with the financial institution computing system 112. In this regard, financial data (or other types of data) may be encrypted and transmitted to prevent or substantially prevent the threat of hacking.

The financial institution computing system 112 further includes an accounts database 138. The accounts database 138 is configured to hold, store, categorize, and otherwise serve as a repository for information associated with accounts held by the financial institution 102. For example, the accounts database 138 may store account numbers, account balances, account ownership information, customer identifiers, and the like. The accounts database 138 may further store information regarding threshold payment amounts and approval thresholds as described above. In some arrangements, the accounts database 138 also stores approval group information as described above. For example, the accounts database 138 can include a predetermined threshold spending amount for each payment account of the user 104. To illustrate, the user 104 may have a checking account and a credit card with the financial institution 102. In this example, for the checking account, the accounts database 138 may store a threshold spending limit of $200 and for the credit card account, the accounts database 138 may store a threshold spending limit of $500. These spending limits may be set by the user 104 and/or determined by the system 100, as described further herein. The accounts database 138 is structured to selectively provide access to information relating to an account at the financial institution 102, including associated customer information and/or identifiers. In this regard, as discussed further herein, the accounts database 138 is communicably and operatively coupled to the account management circuit 140 and payment permission circuit 142 such that the system 100 may facilitate permissioned payments based on threshold spending limits stored in the accounts database 138. Although shown as being part of the memory 136, in some arrangements, the accounts database 138 is a separate component of the financial institution computing system 112.

The financial institution computing system 112 includes a payment processing circuit 140, a payment permission circuit 142, and an account management circuit 144. Although FIG. 1 shows the payment processing circuit 140, the payment permission circuit 142, and the account management circuit 144 as part of the processing circuit 132, in other arrangements one or all of the payment processing circuit 140, payment permission circuit 142, and/or the account management circuit 144 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The payment processing circuit 140 is configured to process payment requests associated with payment accounts of customers (e.g., user 104) of the financial institution 102. The payment requests may be received directly from the user 104 (e.g., via the mobile wallet client 128), from the merchant 106 (e.g., via the merchant POS terminal 116, the eCommerce host 118), or from a payment network associated with a payment account (e.g., from the payment network computing system 160). The payment processing circuit 140 processes the payment requests by approving or declining payment requests. The payment processing circuit 140 determines whether sufficient funds are available for the payment request by checking an account balance for the payment account associated with a customer identifier in the accounts database 138. If funds in the payment account are insufficient to complete the payment request, the payment processing circuit 140 declines the request and communicates the declination to the payment network computing system 160 to be transmitted back to the merchant 106.

When sufficient funds or credit is available to complete the transaction, the payment processing circuit 140 is configured to communicate with the payment permission circuit 142 to determine whether an approval has been completed for the permissioned payment. As such, the payment processing circuit 140 is communicably and operatively coupled to the payment permission circuit 142. As an example, the user 104 may have completed the approval for the permissioned payment prior to attempting the purchase. If an approval has been completed prior to the purchase being submitted, the payment processing circuit 140 approves the payment request. The payment processing circuit 140 communicates the approval to the payment network computing system 160 which transmits the approval to the merchant 106.

When approval has not yet been obtained for the purchase, the payment processing circuit 140 communicates the payment transaction details to the payment permission circuit 142 to complete a permissioned payment for the transaction.

The payment permission circuit 142 is configured to receive the payment transaction details from the payment processing circuit 140 and complete a permissioned payment. The payment permission circuit 142 is configured to determine whether an approval is needed for the completion of the permissioned payment. The payment permission circuit 142 compares the purchase amount to a retrieved threshold payment amount from the accounts database 138 to determine whether the purchase amount exceeds the threshold payment amount. If the purchase amount is higher than the threshold amount, the payment permission circuit 142 generates and transmits a message to the user device 114 to complete an approval process for the transaction. For example, the user 104 has set the threshold payment amount at $200 for a checking account held with the financial institution 102. The user 104 attempts to use the checking account (e.g., via associated payment card 103) to make a purchase of $300. The payment permission circuit 142 compares the threshold payment amount of $200 to the purchase amount of $300 and determines that the purchase amount exceeds the threshold payment amount and alerts the user 104 (e.g., via the user device 114) that an approval is needed prior to purchase.

In some arrangements, the payment permission circuit 142 is configured to communicate with the payment network computing system 160 to place a hold on the purchase item until the user 104 completes the approval process. In some arrangements, the payment permission circuit 142 may request a hold on an item for a certain period of time (e.g., 30 minutes, 1 hour). If the user 104 completes the approval process within the period of time, the transaction can be automatically processed (e.g., via a merchant website). If the user 104 does not complete the approval process within that period of time, the user 104 will need to resubmit the payment details to the merchant 106 to complete the purchase.

The payment permission circuit 142 is further configured to receive the voting results from the social network computing system 108. The payment permission circuit 142 is configured to receive the voting results on a real-time basis as the voting results are received. For example, as the social network connections vote while watching the live video, the voting results are continuously tallied and compared against the approval threshold. In some arrangements, the voting results may be received on a continuous basis, every minute, every five minutes, etc. In other arrangements, the voting results may be received when the voting process is finalized (e.g., when timing circuit 146 communicates to the payment permission circuit 142 that the voting process has ended as described further herein). Once the approval threshold (e.g., percentage of approval votes, number of approval votes) has been reached, the payment permission circuit 142 generates and transmits an approval message to the user 104 indicating the item is approved for purchase. The payment permission circuit 142 additionally communicates the approval to the payment processing circuit 140, which then communicates the approval to the payment network computing system 160 to complete the transaction. In arrangements where the payment is on hold with the payment network computing system 160, the payment permission circuit 142 generates and transmits an approval message to the payment network computing system 160 such that the payment will automatically be processed upon approval.

As an example, the user 104 has defined a threshold payment amount to be $300 for electronics purchases with his checking account. When the user 104 selects a $500 television and attempts to check out at the merchant POS terminal 116, the payment permission circuit 142 determines that the purchase amount of $500 exceeds the threshold payment amount such that an approval is required to make the purchase. As such, the user 104 is prompted to complete a permissioned payment approval process. The user 104 submits a request for approval to his social network connections. The payment processing circuit 142 determines that for electronics purchases, the user 104 has designated approval from a preset "friends" group. As the user 104 is pitching his case for the television purchase, the members of the user's "friends" group are voting to approve or deny the purchase. After a period of time or after a predetermined number of the user's connections have voted, as determined by the timing circuit 146 described further herein, 82% of the user's connections have voted in approval of the purchase. At this point, the payment permission circuit 142 communicates the approval to the user 104 and allows the user to make the purchase.

The account management circuit 132 is structured to perform various account management functions, including maintaining an accounts database 138, updating account balances, applying interest to accounts, processing payments related to accounts, and the like. The account management circuit 132 receives a communication from the payment processing circuit 140 and/or the payment permission circuit 142 that a purchase transaction has been completed. Upon receipt of completed purchase transaction information, the account management circuit 132 deducts the purchase amount from the account balance of the respective payment account in the accounts database 138.

The timing circuit 146 is configured to maintain the operation of the voting approval process for a period of time such that either a predetermined amount of time has passed and/or a predetermined number of votes have been submitted. The timing circuit 146 communicates with the payment permission circuit 142 to keep the voting approval process open for such a period of time. Accordingly, the timing circuit 146 is communicably and operatively coupled to the payment permission circuit 142 to convey timing information. In one example, the timing circuit 146 is configured to count the number of votes submitted. Once the required number of approval votes have been submitted, the timing circuit 146 closes the voting approval process. In another example, the timing circuit 146 is configured to count the amount of time that has passed since the start of the voting approval process. Once the required amount of time has passed, the timing circuit 146 closes the voting approval process. In some arrangements, when the voting approval process is closed, the timing circuit 146 is configured to communicate with the payment processing circuit 142 that the voting approval process has ended.

Figure 2:
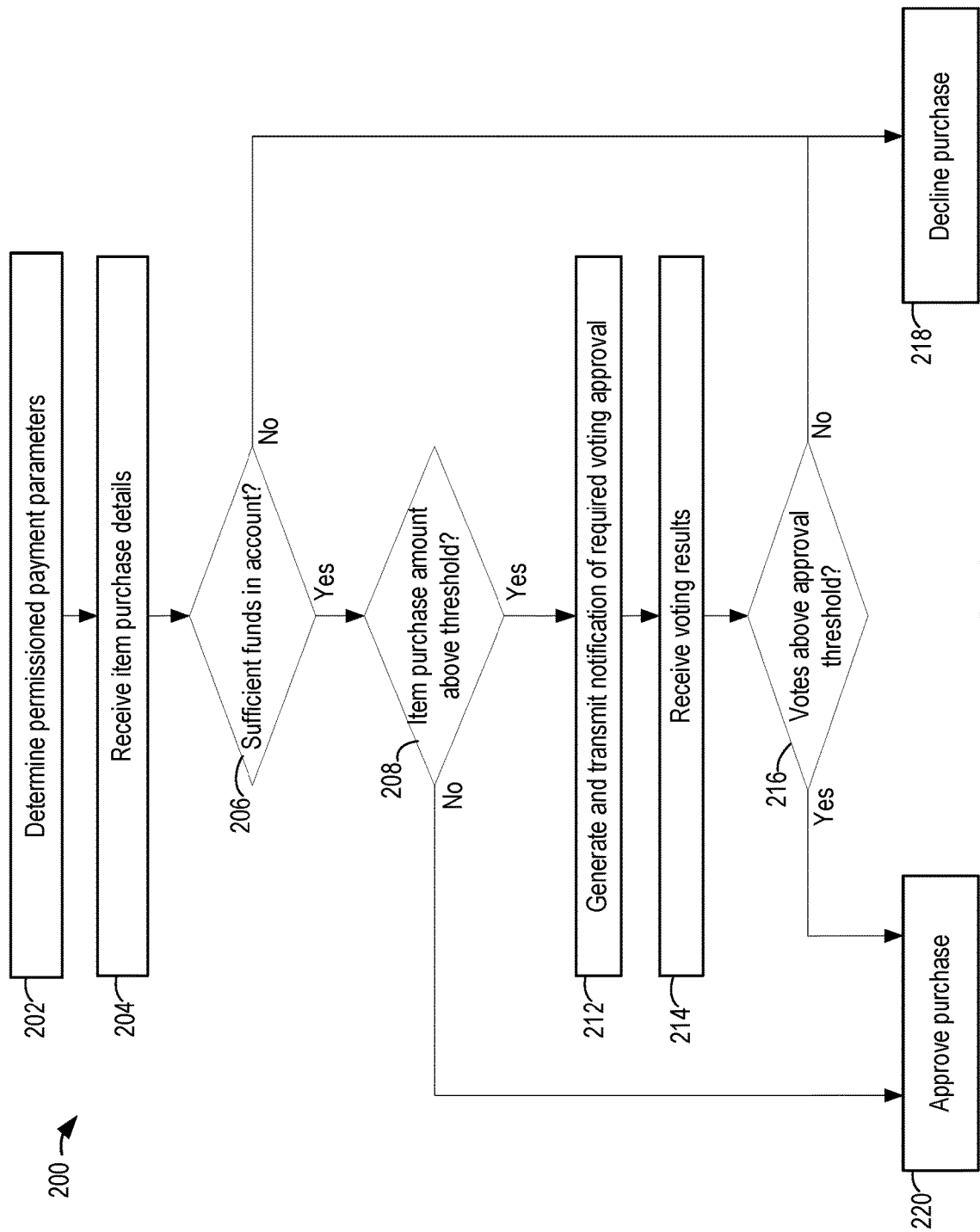
FIG. 2 is a flow diagram of a method of completing a permissioned payment using the system of FIG. 1, according to an example embodiment.
Figure 3:
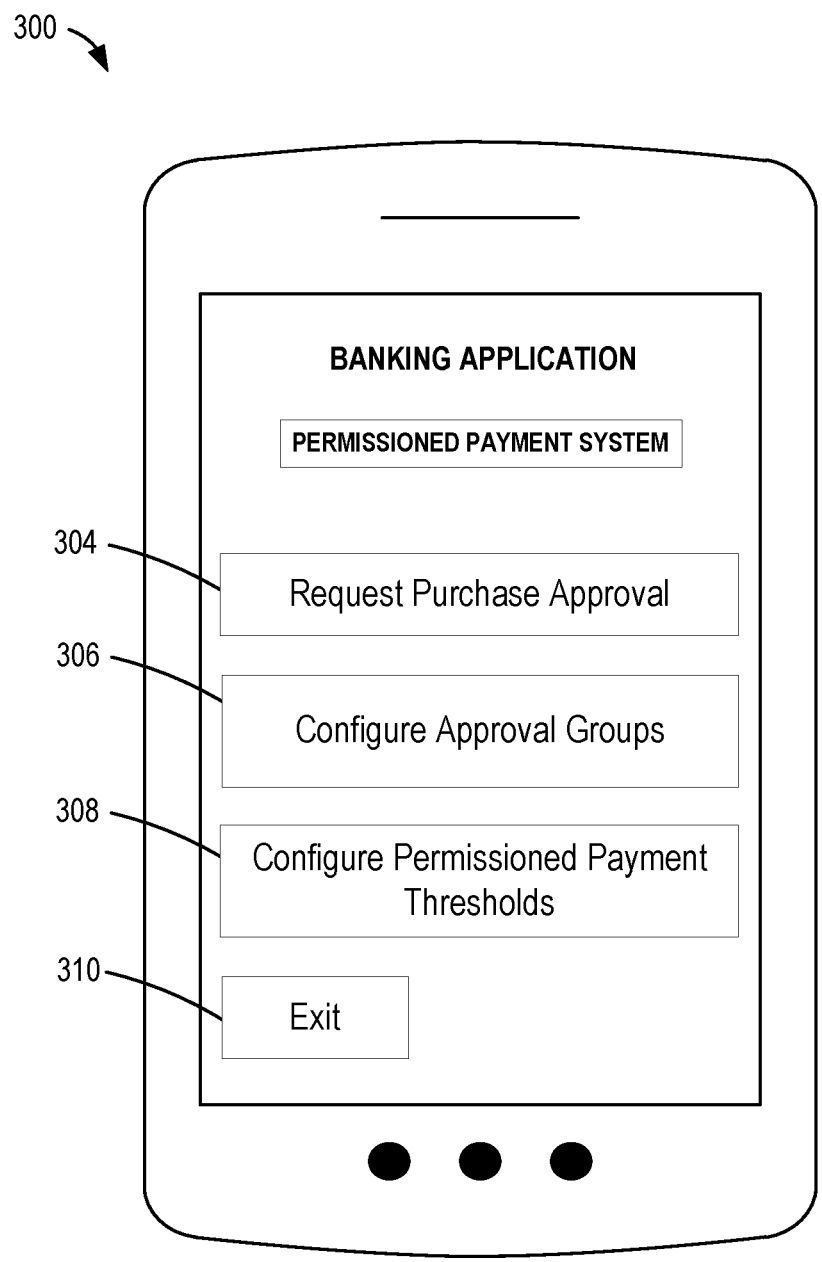
FIG. 3 is a user interface displayed using the system of FIG. 1, according to an example embodiment.

Referring now to FIG. 2, an example method is depicted. Method 200 may be implemented by the payment permissions system 100 of FIG. 1, such that reference may be made to one or more components of FIG. 1 in explaining method 200.

Permissioned payment parameters are determined at 202. In some arrangements, the permissioned payment parameters are stored and accessible in the accounts database 138. The permissioned payment parameters, including threshold payment amounts and approval thresholds, are retrieved by the payment permission circuit 142. In some arrangements, the permissioned payment parameters are defined by the user 104 via the client application 128. The user 104 may set threshold payment amounts according to types of accounts held with the financial institution 102. For example, the user 104 may designate that a threshold payment amount for a checking account is $300 and for a credit card account is $500. Alternatively, the user 104 may set threshold payment amounts according to types of items that may be purchased. For example, the user 104 may set a threshold payment amount for electronic purchases to be $500. The user 104 may additionally set approval thresholds according to types of accounts and/or types of purchase items. For example, the user 104 defines that if attempting an electronics purchase, a certain number of votes or percentage of votes must approve of the purchase for completion of a permissioned payment.

Figure 4:
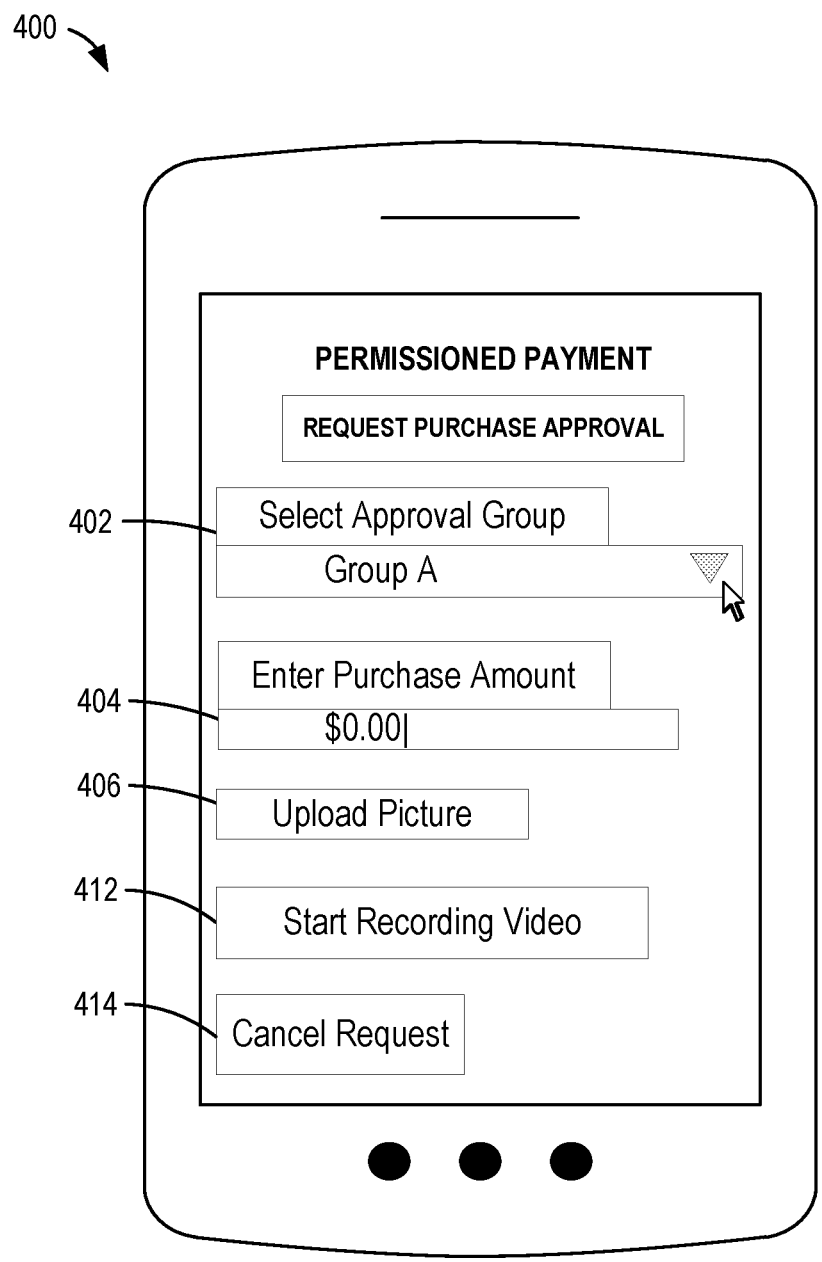
FIG. 4 is a user interface displayed using the system of FIG. 1, according to an example embodiment.

Item purchase details are received at 204. In some arrangements, the item purchase details, including the item purchase amount, are communicated to the financial institution computing system 112 along with other transaction details from the merchant 106 (e.g., via the payment network computing system 160). The item purchase details transmitted to the financial institution computing system 112 can include the type of item for purchase such that the corresponding threshold payment amount may be retrieved from the accounts database 138. For example, if the user 104 has set a threshold payment amount as $500 for all purchases of electronics, the permissioned payment system 142 can retrieve this information from the accounts database 138 based on receiving details from the merchant 106 that the user 104 is attempting to purchase electronics. In some arrangements, the item purchase details are communicated to the financial institution computing system 112 from the user device 114 when a user 104 has not yet attempted to complete the purchase and instead, submits an approval request via the user device 114 (e.g., via the client application 128). For example, the user 104 selects a television for purchase and opens the client application 128 on the user device 114. The user 104 inputs the purchase amount and the type of purchase (e.g., television) into the client application 128. In some arrangements, the user 104 can upload a picture of the purchase item to the client application 128 (e.g., as shown in FIG. 4) such that when the picture is uploaded, the system can detect (e.g., from a barcode, tag, quick response (QR) code, image recognition) that the picture is of a television. In some arrangements, a link to the purchase item information (e.g., on a retailer's website) is uploaded.

An account balance is compared to the item purchase amount at 206. In some arrangements, the account balance is retrieved from the accounts database 138 and compared to the item purchase amount by the payment processing circuit 140. If sufficient credit or funds are not available in the account balance of the respective payment account, the purchase is declined at 218.

The item purchase amount is compared to the threshold payment amount at 208. In some arrangements, the item purchase amount is compared to the threshold payment amount by the payment permission circuit 142. The threshold payment amount is received, along with other permissioned payment parameters, from the user 104 (e.g., via client application 128) and stored in the accounts database 138. If the item purchase amount exceeds the threshold payment amount, the payment permission circuit 142 communicates with the user device 114 to notify the user 104 that a voting approval process is required for the purchase transaction. In some arrangements, the voting approval process is automatically initiated in response to the item purchase amount exceeding the threshold payment amount (e.g., in response to the user scanning a bar code of the item using the user device 114). If the item purchase amount does not exceed the threshold payment amount, the payment permission circuit 142 communicates with the user device 114 to notify the user 104 that the purchase is approved. The payment permission circuit 142 also communicates with the merchant 106 (e.g., via the payment network computing system 160) that the purchase is approved by the financial institution 102. The purchase is then approved at 220.

Notification of required voting approval is generated and transmitted at 212. In some arrangements, the notification is generated by the payment permission circuit 142 and transmitted to the user device 114. The notification may include details regarding the preset approval group and approval threshold associated with the received transaction details. For example, the user 104 may have defined that an electronics purchase should be approved by Group A with an 80% approval rate. In some arrangements, the notification is generated and transmitted to the merchant 106 (e.g., merchant POS terminal 116) such that the merchant 106 is additionally notified of the temporarily declined transaction.

Voting results are received at 214. In some arrangements, the payment permission circuit 142 receives the voting results from the social network computing system 108. In some arrangements, the voting results may be delivered to the financial institution computing system 112 upon the finalization of the voting process. The timing circuit 146 may deliver the voting results upon closing the approval voting. The timing circuit 146 may count the number of overall votes and/or an amount of time that has passed since the start of the voting process prior to closing the voting process. In other arrangements, the voting results may be delivered continuously or in increments to the payment permission circuit 142.

Voting results are compared to the approval threshold at 216. In some arrangements, the voting results are compared to the preset approval threshold by the payment permission circuit 142. The voting results and/or the approval threshold may be reported in either percentage of votes and/or number of votes. The approval threshold may be defined by the user 104 using the client application 128 and is stored in the accounts database 138. As noted above, the approval threshold may be designated by the user 104 according to various parameters. The approval threshold may be based on account type, purchase type, merchant, etc.

The purchase is declined at 218. If the number of or percentage of received approval votes does not meet or exceed the approval threshold set by the user 104, the purchase is declined. Additionally, if the available funds in the account balance are insufficient to cover the purchase amount, the purchase is declined after step 206 and no permissioned payment is completed. If a transaction is held by the payment network computing system 160, the declined message will be transmitted to the payment network computing system 160 to remove the hold and decline the transaction. The decline message is also transmitted to the merchant 106 (e.g., via the payment network computing system 160) such that the merchant 106 is also notified of the declined transaction.

The purchase is approved at 220. If the available funds in the account balance associated with the payment card 103 are sufficient to cover the purchase amount and the number of or percentage of approval votes meet or exceed the approval threshold, the purchase transaction is approved. In some arrangements, the payment processing circuit 140 transmits the approval message to the payment network computing system 160. In some arrangements, the approval message is also transmitted to the merchant 106 (e.g., via the payment network computing system 160).

Referring to FIGS. 3-8, various user interfaces displayed by the system 100 are shown, according to example embodiments. The user interfaces may be displayed to the user 104 on the user device 114 (e.g., via the client application 128, via the social network client 126). The user 104 first logs into the client application 128 or to a mobile banking website portal via the user device 114 to access the banking portal. Through the banking portal, the user 104 can select from a number of options relating to the user's accounts at the financial institution 102, including access to the permissioned payment system, where the user 104 can request voting approval of a purchase and configure parameters of the system. The options include a "Request Purchase Approval" selection 304, a "Configure Permissioned Payment Thresholds" selection 306, a "Configure Approval Groups" selection 308, and an "Exit" selection 310.

If the customer 106 selects the "Request Purchase Approval" selection 304, the user interface of the banking portal updates to display a request purchase approval screen (as shown in FIG. 4). As shown in FIG. 4, the user 104 can select an approval group at 402, where the user selects from predefined approval groups to complete the approval process. For example, the "Select Approval Group" selection 402 includes a drop-down menu of predefined approval groups the user 104 can choose from. The user 104 can also enter a purchase amount to be approved at the "Enter Purchase Amount" selection 404. The user 104 can additionally upload a picture of the item to be purchased at the "Upload Picture" selection 406. Once the user 104 has selected the desired approval group and entered the purchase amount, the user 104 can select the "Start Recording Video" selection 412 to begin live streaming a pitch for the item to the user's selected approval group. If the user 104 decides to cancel the request, the user 104 can select the "Cancel Request" selection 414 and the user interface will update to the home screen of the client application 128.

Figure 5:
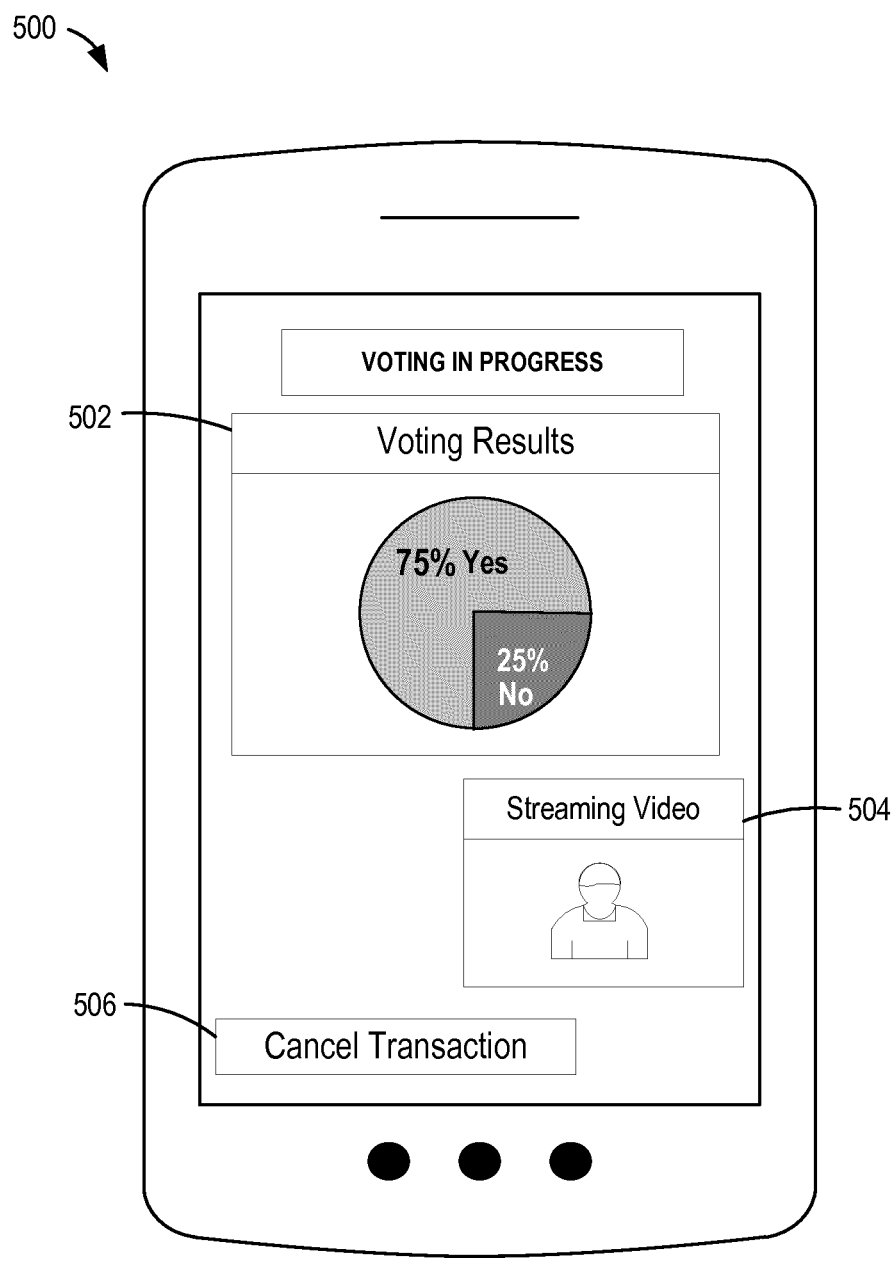
FIG. 5 is a user interface displayed using the system of FIG. 1, according to an example embodiment.
Figure 6:
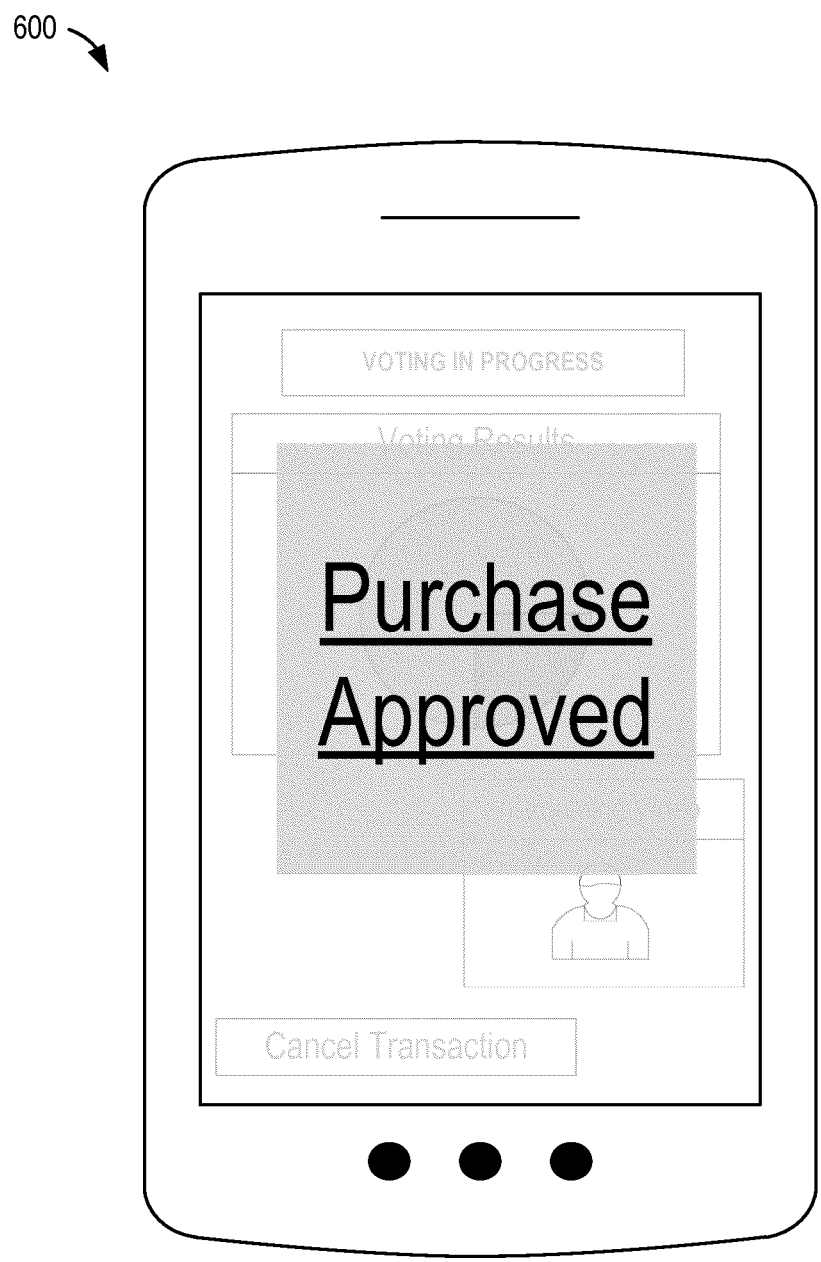
FIG. 6 is a user interface displayed using the system of FIG. 1, according to an example embodiment.

Once the user 104 selects the "Start Recording Video" selection 412 on the screen shown in FIG. 4, the user interface of the banking portal updates to display a "Voting in Progress" screen as shown in FIG. 5. On the screen shown in FIG. 5, the user can view the live streaming video at the "Streaming Video" 504 portion of the interface. The user 104 can additionally see the live results of the approval voting for the purchase at the "Voting Results" portion of the interface. When the system determines that enough time has passed or enough votes have been recorded (e.g., via the timing circuit 146 described above) and that the approval threshold has been passed (e.g., via the payment permission circuit 142 described above), the user interface will update to display an approval message (e.g., screen shown in FIG. 6). At this point, the user 104 is approved to make the purchase.

Figure 7:
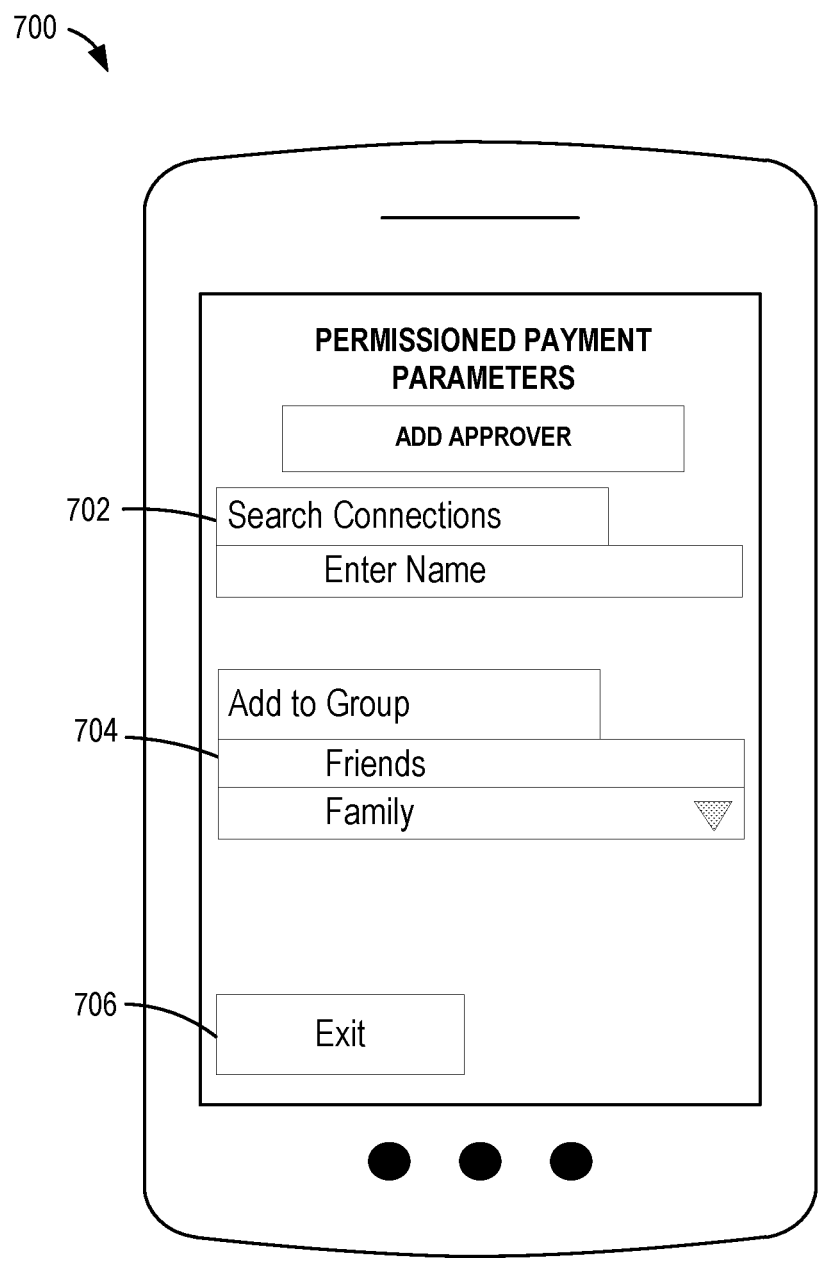
FIG. 7 is a user interface displayed using the system of FIG. 1, according to an example embodiment.

If the user 104 selects the "Configure Approval Groups" selection 306 on display 300, the user interface of the banking portal updates to display a permissioned payment parameters display (as shown in FIG. 7). The permissioned payment parameters allow the user 104 to provide details regarding a permissioned payment to the financial institution computing system 112 (e.g., to adjust and/or add approvers to an approval group). The available options on display 700 are presented to the user 104 as a "Search Connections" input 702 and an "Add to Group" selection 704. When the user 104 inputs a connection, the user interface displays the search results of the name input at 702. In some arrangements, as the user 104 begins to type, the user interface displays all search results pertaining to the input. For example, the user 104 types the letter A and all connections beginning with the letter A are displayed and so on. When the user 104 selects a name from the list of connections displayed, the "Add to Group" selection 704 is then interactive and the user 104 can select the group to which the connection should be added. Once the user 104 selects the group, the connection is added and the user can then exit the screen by selecting the "Exit" selection 706.

Figure 8:
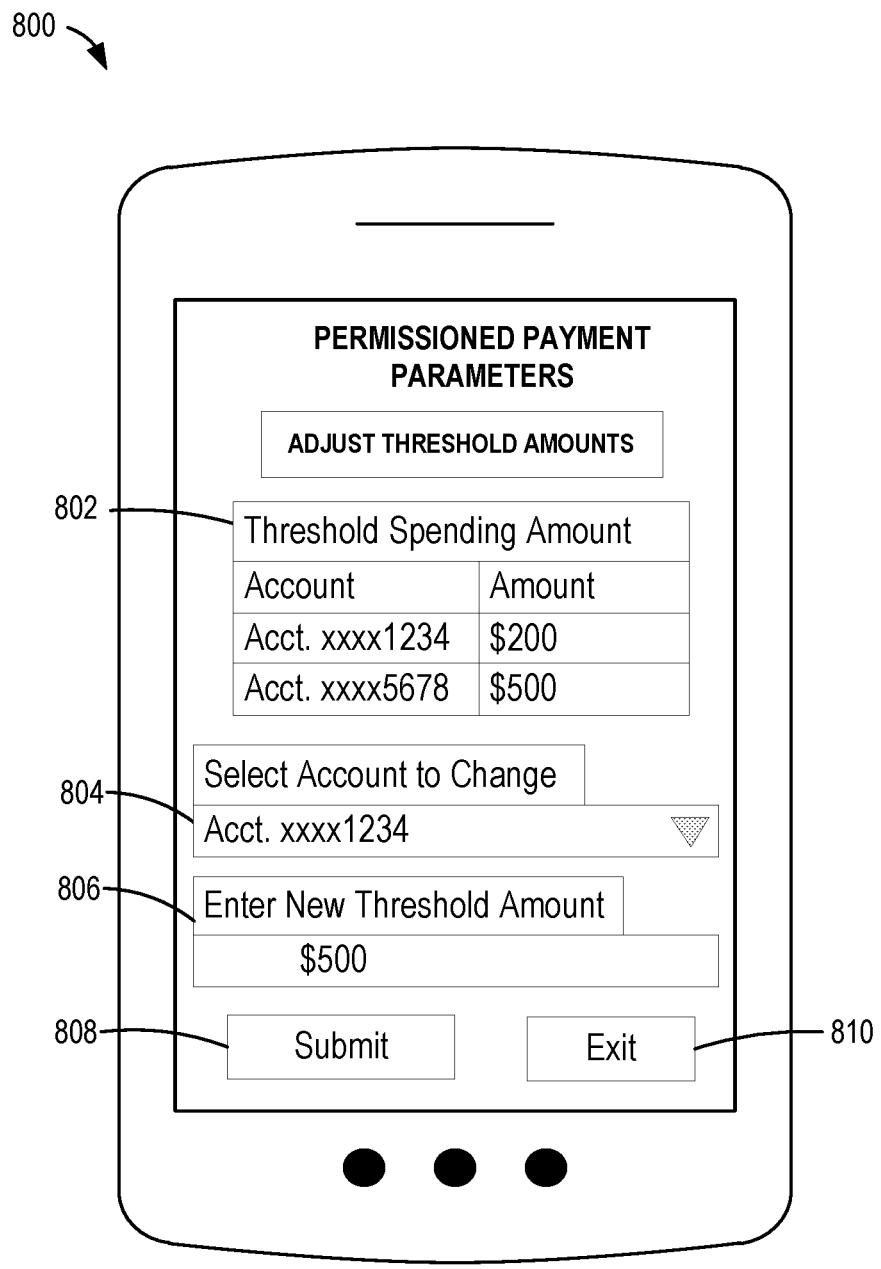
FIG. 8 is a user interface displayed using the system of FIG. 1, according to an example embodiment.

If the user 104 selects the "Configure Permissioned Payment Thresholds" selection 308 on display 300, the user interface of the banking portal updates to display a permissioned payment parameters display (as shown in FIG. 8). The permissioned payment parameters allow the user 104 to provide details regarding a permissioned payment to the financial institution computing system 112 and specifically, to adjust the threshold payment amounts. The display 800 includes a "Threshold Spending Amount" display 802 showing the user 104 the current threshold payment amounts. In the example shown in FIG. 8, the threshold payment amounts are shown according to different accounts of the user. In some arrangements, the threshold payment amounts can be displayed as relating to purchase items, merchants, and so on. The threshold payment amounts can be changed by selecting the "Select Account to Change" option 804, allowing the user to select an account and subsequently enter at "Enter New Threshold Amount" option 806 a new threshold amount for that account. Once the user 104 has completed the threshold payment amount updates, the user 104 can select the "Submit" selection 808 to submit the update to the system. If the user 104 decides not to make any updates to the amounts, the user 104 can select the "Exit" selection 810.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In some example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAIVI, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A financial institution computing system, the system comprising:
   a network interface structured to facilitate data communication via a network;
   an accounts database structured to store information associated with a plurality of accounts held by a financial institution, the plurality of accounts including a payment account associated with a customer associated with a customer identifier; and
   a processing circuit comprising a processor and memory, the processing circuit configured to implement a payment permission system configured to:
      receive a purchase approval request, the purchase approval request including a purchase amount, a merchant identifier, and the customer identifier;
      generate a notification in response to determining that the purchase amount exceeds a threshold payment amount, the notification indicating that the purchase approval request requires voting approval via a voting approval process, and requesting one or more reasons for the purchase approval request from the customer;
      transmit the notification to a customer device associated with the customer;
      receive a video pitch from the customer device;
      conduct the voting approval process, wherein the voting approval process includes receiving votes from a plurality of social connections of the customer; and
      transmit to a merchant transaction device associated with the merchant identifier a message to authorize or decline the purchase approval request based on the voting approval process.

2. The system of claim 1, wherein the processing circuit is further configured to determine a number of approval votes approving the purchase approval request.

3. The system of claim 2, wherein the processing circuit is further configured to:
   determine that the number of approval votes exceeds an approval threshold value set by the customer and stored in the accounts database; and
   generate and transmit a notification to the customer device that the purchase approval request is approved.

4. The system of claim 2, wherein the processing circuit is further configured to:
   determine that the number of approval votes does not exceed an approval threshold value set by the customer and stored in the accounts database; and
   generate and transmit a notification to the customer device that the purchase approval request is declined.

5. The system of claim 1, wherein the voting approval process causes the customer device to activate a video camera and provide a live video stream to the devices of the plurality of social connections.

6. The system of claim 1, wherein the processing circuit is further configured to end the voting approval process based on determining that the number of votes exceeds a predetermined number of votes.

7. The system of claim 1, wherein the processing circuit is further configured to end the voting approval process based on determining that the voting approval process exceeds a predetermined period of time.

8. The system of claim 1, wherein the processing circuit is further configured to receive permissioned payment parameters from the customer device, wherein the permissioned payment parameters include at least one of an approval threshold, a threshold payment amount, and an approval group.

9. The system of claim 1, wherein the plurality of votes are received from a social network computing system, wherein the customer is a member of a social network maintained by the social network computing system.

10. A method of performing a permissioned payment, the method comprising:
    receiving, by a financial institution computing system, a purchase approval request including a purchase amount, a merchant identifier, and a customer identifier;
    generating, by the financial institution computing system, a notification in response to determining that the purchase amount exceeds a threshold payment amount, the notification indicating that the purchase approval request requires voting approval via a voting approval process, and requesting one or more reasons for the purchase approval request from a customer;
    transmitting, by the financial institution computing system, the notification to a customer device associated with the customer;
    receiving a video pitch from the customer device;
    conducting, by the financial institution computing system, the voting approval process, wherein the voting approval process includes receiving votes from a plurality of social connections of the customer; and
    transmitting, by the financial institution computing system, to a merchant transaction device associated with the merchant identifier, a message to authorize or decline the purchase approval request based on the voting approval process.

11. The method of claim 10, wherein the processing circuit is further configured to determine a number of approval votes from the plurality of votes.

12. The method of claim 11, wherein the processing circuit is further configured to:

determine that the number of approval votes exceeds an approval threshold value set by the customer and stored in the accounts database; and generate and transmit a notification to the customer device that the purchase approval request is approved.

13. The method of claim 11, wherein the processing circuit is further configured to:

determine that the number of approval votes does not exceed an approval threshold value set by the customer and stored in the accounts database; and generate and transmit a notification to the customer device that the purchase approval request is declined.

14. The method of claim 10, wherein the voting approval process causes the customer device to activate a video camera and provide a live video stream to the devices of the plurality of social connections.

15. The method of claim 10, wherein the processing circuit is further configured to end the voting approval process based on determining that the plurality of votes exceeds a predetermined number of votes.

16. The method of claim 10, wherein the processing circuit is further configured to end the voting approval process by determining that the voting approval process exceeds a predetermined period of time.

17. The method of claim 10, wherein the processing circuit is further configured to receive permissioned payment parameters from the customer device, wherein the permissioned payment parameters include at least one of an approval threshold, a threshold payment amount, and an approval group.

18. The method of claim 10, wherein the plurality of votes are received from a social network computing system, wherein the customer is a member of a social network maintained by the social network computing system.

19. A mobile device comprising:

a network interface structured to communicate data to and from a financial institution computing system associated with a financial institution;

a display device configured to present information to a customer;

an input/output device structured to exchange data with the customer; and a processing circuit comprising a processor and memory, the memory structured to store instructions that are executable by the processor and cause the processing circuit to implement a mobile wallet, the mobile wallet configured to:

receive, by the input/output device, a permissioned payment parameter;

transmit, by the network interface, the permissioned payment parameter to the financial institution computing system;

generate a purchase approval request associated with the payment account and including a purchase amount, and a merchant identifier;

receive, by the network interface, a notification requesting one or more reasons for the purchase approval request from the customer;

transmit, by the network interface, the purchase approval request and a video pitch;

receive, by the network interface, voting approval data from a voting approval process completed by the financial institution computing system;

generate, by the display device, a voting approval presentation including the voting approval data; and transmit, to a merchant transaction device associated with the merchant identifier, a message to authorize or decline the purchase approval request based on the voting approval data.

20. The mobile device of claim 19, wherein the processing circuit is further configured to receive, by the network interface, an indication that the voting approval process has been completed by the financial institution computing system.

21. The mobile device of claim 20, wherein the processing circuit is further configured to receive an approval notification from the financial institution computing system together with the indication that the voting approval process has been completed.

22. The mobile device of claim 21, wherein the processing circuit is further configured to transmit payment information to a merchant point-of-sale terminal upon completion of the voting approval process.

* * * * *